US008819284B2

United States Patent
Nguyen et al.

(10) Patent No.: US 8,819,284 B2
(45) Date of Patent: Aug. 26, 2014

(54) METHODS, SYSTEMS AND APPARATUS TO ROUTE CLOUD-BASED SERVICE COMMUNICATIONS

(75) Inventors: Han Nguyen, Marlboro, NJ (US); Huajin Jeng, Middletown, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 200 days.

(21) Appl. No.: 13/221,024

(22) Filed: Aug. 30, 2011

(65) Prior Publication Data

US 2013/0054830 A1 Feb. 28, 2013

(51) Int. Cl.
*G06F 12/00* (2006.01)
(52) U.S. Cl.
USPC .......................................... 709/245; 709/238
(58) Field of Classification Search
USPC ................... 709/245, 238, 242–244
See application file for complete search history.

(56) References Cited

U.S. PATENT DOCUMENTS

| 7,411,955 B2 | 8/2008 | Li et al. |
| 7,693,073 B2 | 4/2010 | Soja-Molloy et al. |
| 7,787,396 B1 | 8/2010 | Nalawade et al. |
| 2004/0037275 A1* | 2/2004 | Li et al. .......................... 370/370 |
| 2007/0097991 A1 | 5/2007 | Tatman |
| 2008/0089334 A1* | 4/2008 | Soja-Molloy et al. ........ 370/392 |
| 2010/0142532 A1 | 6/2010 | Soja-Molloy et al. |
| 2010/0177632 A1 | 7/2010 | Tarnanen |
| 2011/0075674 A1 | 3/2011 | Li et al. |

OTHER PUBLICATIONS

"Interior Gateway Protocol," retrieved from Wikipedia on Jul. 13, 2011, 2 pages.
"Open Shortest Path First," retrieved from Wikipedia on Jul. 13, 2011, 13 pages.
Schluting, Charlie, "Understanding OSPF Routing," retrieved from Webopedia on Jul. 13, 2011, posted Jun. 23, 2006, 2 pages.

* cited by examiner

*Primary Examiner* — Kenneth Coulter
(74) *Attorney, Agent, or Firm* — Hartman & Citrin LLC

(57) ABSTRACT

Methods, systems and apparatus are disclosed to route cloud-based service communications. An example method includes generating a default route address associated with a selected one of a plurality of candidate transit routers in response to an identification of a virtual private network addition to the cloud-computing network, and assigning the default route address to a cloud service access router to direct a routing request from the cloud service access router to the selected one of the candidate transit routers via the default route address.

22 Claims, 8 Drawing Sheets

FIG. 1 – PRIOR ART

METHODS, SYSTEMS AND APPARATUS TO ROUTE CLOUD-BASED SERVICE COMMUNICATIONS

FIELD OF THE DISCLOSURE

This disclosure relates generally to network communications, and, more particularly, to methods, systems and apparatus to route cloud-based service communications.

BACKGROUND

In recent years, cloud computing services have been developed and deployed that allow customers to utilize computing resources without a need to make capital expenditures to acquire/own such computing resources. Typically, a cloud computing service provider configures one or more computers and/or computer systems to provide cloud services. The computers have at least one processor, memory and network ports to provide access to the one or more computers and/or computer systems. These cloud computer systems may include any number of processors, storage and/or network access devices (e.g., network interface card(s) (NICs)) to allow any number of customers access to cloud service(s) provided by the computer systems. Services may include, but are not limited to, numerical processing, commercial transaction processing and/or web hosting.

In some examples, the cloud computing service provider configures the computer systems with one or more virtual machines (VMs) to service one or more customers' computing needs. Generally speaking, VMs are virtual instances of an operating system that execute on underlying hardware resources in a time-sliced manner. A VM user is provided with computing services, such as an operating system user interface, storage space and/or applications (e.g., database query engines, numerical processing applications, graphical processing applications, web server applications, etc.) that are logically separated from any other instantiated VMs operating on the underlying hardware resources managed by the cloud computing service provider.

DETAILED DESCRIPTION

Figure 1:
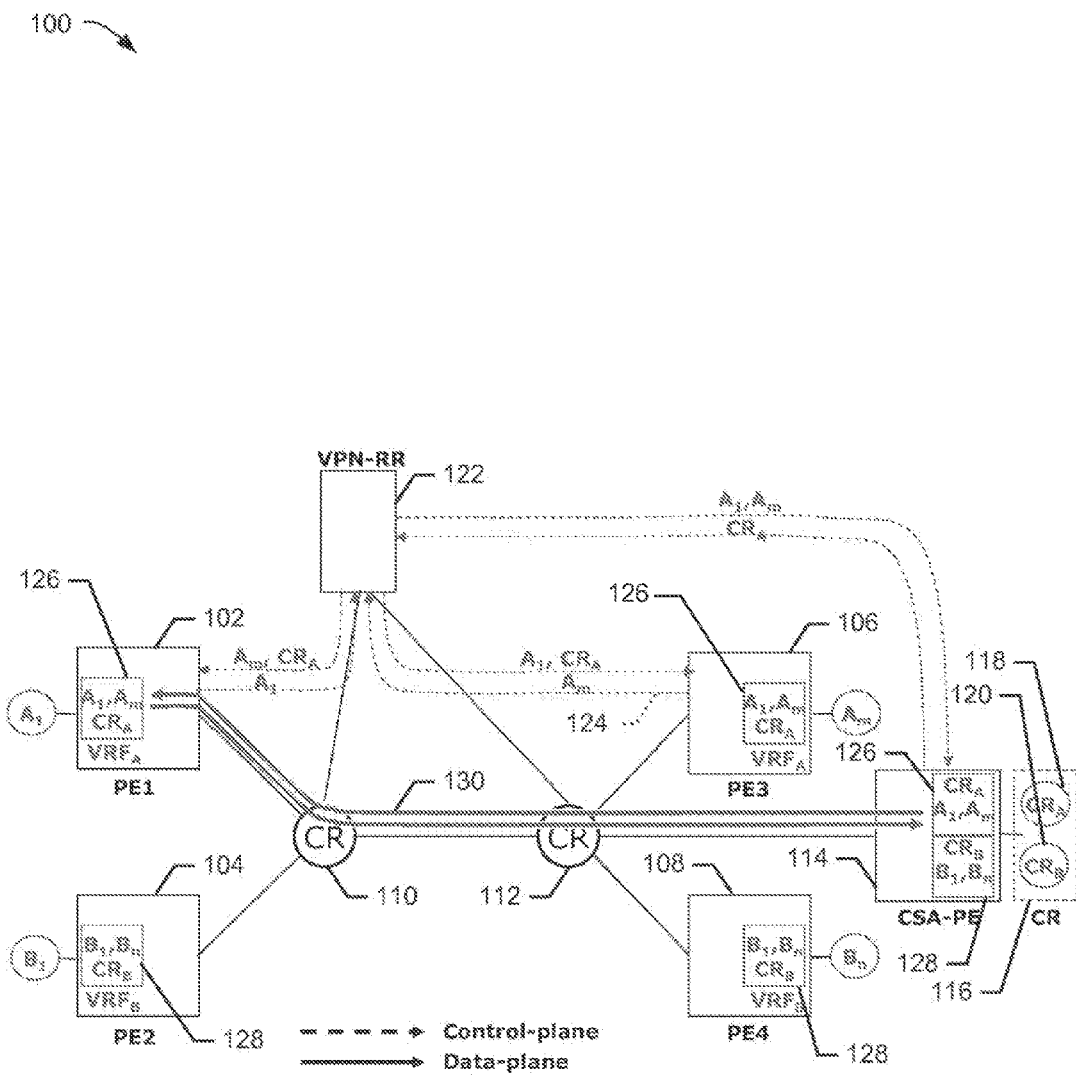
FIG. 1 is a schematic illustration of an example system to facilitate cloud-based services.

Methods, systems, apparatus, and articles of manufacture are disclosed, which include generating a default route address associated with a selected one of a plurality of candidate transit routers in response to an identification of a virtual private network addition to the cloud-computing network, and assigning the default route address to a cloud service access router to direct a routing request from the cloud service access router to the selected one of the candidate transit routers via the default route address.

Cloud-based resource service provision allows customers to avoid capital expenditure in computer hardware while obtaining the benefit of having such computer resources available for computing operation(s). At least one example of a cloud-based resource service provider is AT&T Synaptic Hosting Service®, which manages network accessible computer resources for a fee. In some examples, fees charged by the cloud-based resource service provider are calculated based on a metric associated with processor utilization. In other examples, fees charged by the cloud-based resource service provider are calculated as a flat fee associated with an amount of usage time (e.g., minutes, hours, days, weeks, months).

Computing resources managed by the cloud-based resource service provider are typically high-end server machines having multiple processors and/or processors having multiple cores. The example computing resources managed by the cloud-based resource service provider are typically virtualized, in which a virtual machine manager (VMM) creates one or more virtual machines (VMs) that are logically separate from any other VMs instantiated by the VMM. In other words, although each VM shares underlying hardware resources on a time-slice basis, the allocated processes, memory and/or storage space of one VM are not accessible by any other VM executing on the underlying hardware resources.

Facilitating access to the cloud-based resource service provider services, such as one or more VMs dedicated to a customer, may occur by way of an Internet protocol (IP) network based virtual private network (VPN). Each customer of the cloud-based resource service provider may wish to establish any number of users of the VPN located at any number of network nodes. In some examples, each network node is facilitated by a customer access provider edge (PE) router. Each user at each PE router is associated with an addressable route that allows directed communication/data transfer between nodes and/or users of the nodes within the VPN.

In some examples, computing resources (CRs) (e.g., servers, storage, appliances (e.g., firewalls, load balancers, web accelerators, database engines, etc.)) provided by and/or otherwise maintained by the cloud-based resource service provider are communicatively connected to a cloud service access (CSA) PE router. In the event a VPN user at a PE router (sometimes referred to herein as a "node" of a network) wishes to access the CR, a route address of the CSA-PE router must be known by the originating PE router node. Similarly, in the event a user of the CR wishes to communicate with any node of the VPN, that route address of the destination PE router must be known by the originating CSA-PE router.

Each of the PE routers and/or CSA-PE routers of a VPN includes a data-plane and a control-plane. The data-plane manages, in part, the packet destination address lookup and packet forwarding for the router. The control-plane manages, in part, route topology awareness and routing information propagation to other network nodes. As the number of nodes and/or users at nodes increases, such as by way of additional PE routers and/or CSA-PE routers, the corresponding destination route addresses must be propagated to all of the existing routers of the VPN. Furthermore, as the number of nodes and/or users at nodes increases, the control-plane of each of the routers within the VPN becomes inundated with additional route addresses of which to be aware. In some examples, the CSA-PE and/or CR communicatively connected to the CSA-PE experience an overburdened resource drain of the control-plane at the expense of the data-plane, thereby affecting the user experience of one or more users of VMs instantiated and/or maintained by the CR.

In the illustrated example of FIG. 1, a cloud-based network environment 100 includes a first PE router 102 ("PE$_1$"), a second PE router 104 ("PE$_2$"), a third PE router 106 ("PE$_3$") and a fourth PE router 108 ("PE$_4$"). A first VPN of the example cloud-based network environment 100 includes the example first PE router 102 and the example third PE router 106, which may exchange communication information therebetween via example core routers 110, 112. A second VPN of the example cloud-based network environment 100 includes PE$_2$ 104 and PE$_4$ 108, which may exchange communication information therebetween via the core routers 110, 112. While the example cloud-based network environment 100 may include any number of PE routers and establish any number of VPNs, the example cloud-based network environment 100 of FIG. 1 includes a limited scope for ease of illustration.

The example cloud-based network environment 100 of FIG. 1 also includes an example CSA-PE 114 communicatively connected to an example CR 116. As described above, the example CR 116 may include any type of computing equipment purchased, provided and/or otherwise managed by the example cloud resource service provider. The example CR 116 may include, but is not limited to computers, computer systems, servers, storage and/or appliances. For example, servers of the CR 116 may include any number of processors, each of which include any number of cores and/or memories. Such relatively high-end computing equipment may be implemented by the cloud resource service provider to accommodate customers having computationally intensive tasks to be executed and/or having relatively high bandwidth data transfer needs.

In the illustrated example of FIG. 1, a first CR user ("CR$_A$") 118 and a second CR user ("CR$_B$") 120 each have an associated VM that utilizes one or more underlying hardware resources of the example CR 116. In operation, a VMM of the example CR 116 divides access to the one or more underlying hardware resources to each of CR$_A$ 118 and CR$_B$ 120 on a time-shared basis. However, in other examples, each user of the example CR 116 may have direct and/or otherwise exclusive access to one or more underlying hardware resources of the example CR 116.

To allow CR$_A$ 118 and/or CR$_B$ 120 to forward communications to any other node or user at any other node of the example VPN, a routing address is needed by the CSA-PE 114. When a new user of a node is added to the example cloud-based network environment 100 of FIG. 1, the PE associated with the new user forwards its associated routing information to a VPN route reflector (RR) 122. To illustrate by way of example, if PE$_3$ 106 is added to the cloud-based network environment 100 and/or if user A$_m$ of PE$_3$ 106 is added, then PE$_3$ 106 sends route addressing information for the associated user A$_m$ to the RR 122 (see dashed control-plane communication 124). The example RR 122 serves as, in part, a consolidated location for a network to collect and propagate routing information of the network. In response to receiving network routing updates, the example RR 122 sends the updated routing information or a portion of the updated routing information to routers within the example cloud-based network environment 100. For example, the RR 122 transmits the new route addressing information for the user A$_m$ to each of PE$_1$ 102, PE$_2$ 104, PE$_3$ 106, PE$_4$ 108, and CSA-PE 114.

After the new route addressing information is received and/or otherwise retrieved by the example PE$_1$ 102, PE$_2$ 104, PE$_3$ 106, PE$_4$ 108, CSA-PE 114 and/or any other router(s) and/or any other user(s) of router(s) that may participate in the example cloud-based network environment 100, such new route addressing information is stored in a virtual routing forwarding (VRF) table of the corresponding device. Example table VRF$_A$ 126 is the VRF associated with the first VPN of the example cloud-based network environment 100. As such, VRF$_A$ 126 stores all routing information for the first VPN and is stored in the example PE$_1$ 102, the example PE$_3$ 106, and the example CSA-PE 114. After route addressing information is distributed (see dashed lines of the example cloud-based network enviroment 100), data communication 130 may occur between one or more nodes of the VPN corresponding to the address information (see solid lines with arrows of the example cloud-based network environment 100). In the illustrated example of FIG. 1, because both the CSA-PE 114 and PE$_1$ 102 include VRF$_A$ 126, the CSA-PE 114 can directly route data communication 130 to PE$_1$ 102 and/or to one or more users of PE$_1$ 102. Similarly, VRF$_B$ 128 is the VRF associated with the second VPN of the example cloud-based network environment 100. As such, VRF$_B$ 128 stores the routing information for the second VPN and is stored in the example PE$_2$ 104, the example PE$_4$ 108 and the example CSA-PE 114.

At least one problem associated with the increasing popularity of cloud-based network services includes circumstances in which example CSA-PEs become inundated with control-plane responsibilities. In the illustrated example of FIG. 1, the CSA-PE 114 must store a VRF table for all of the VPNs operating on the example cloud-based network environment 100. For example, although each of the example PEs stores a respective VRF table for its associated VPN, the example CSA-PE 114 must store both VRF$_A$ 126 and VRF$_B$ 128 to facilitate correct routing operations for nodes associated with the first VPN and the second VPN. In some examples, the addition of VPNs, the addition of nodes (e.g., one or more additional PEs), and/or the addition of users at any of the nodes, increases the control-plane responsibilities of the example CSA-PE 114 at the expense of the data-plane responsibilities of the example CSA-PE 114 (e.g., reduces the data handling capacity of the CSA-PE 114).

Figure 2:
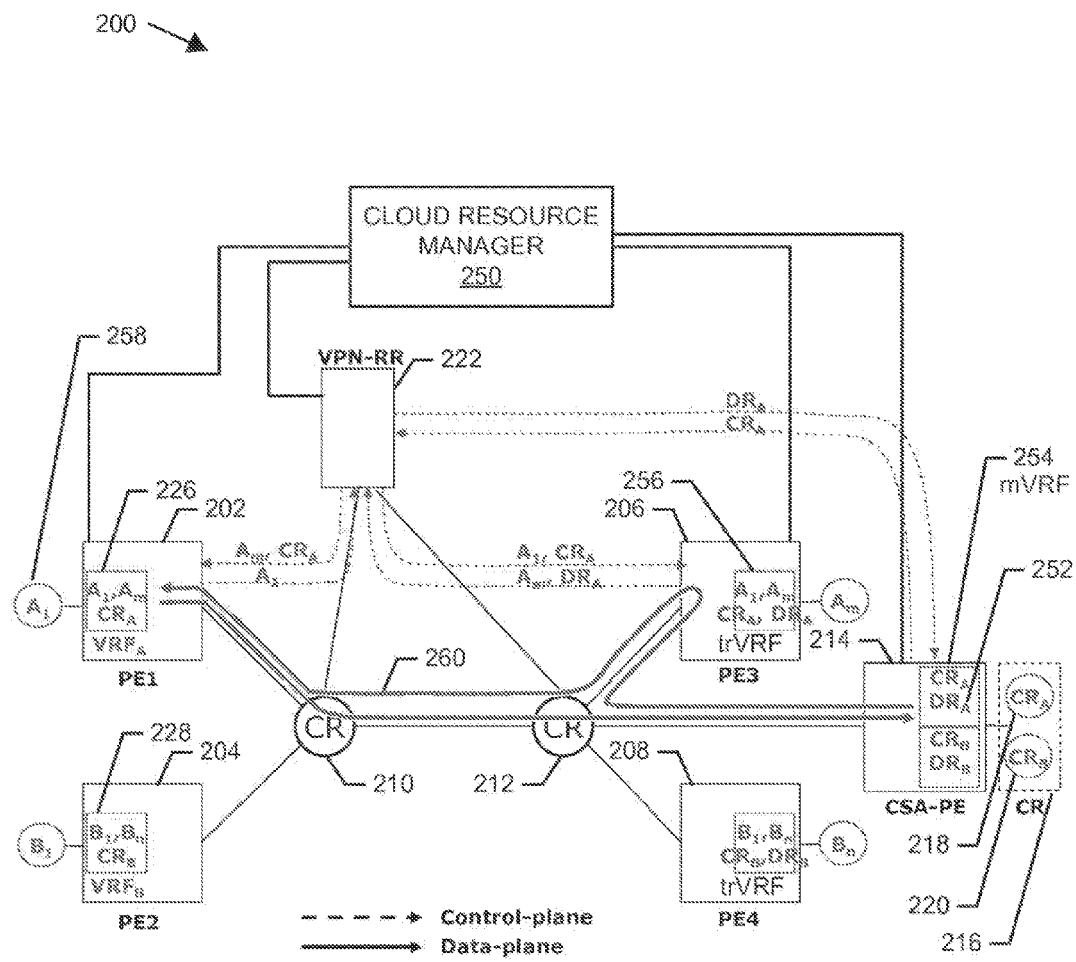
FIG. 2 is a schematic illustration of an example system to route cloud-based service communications.

Methods, systems, apparatus and/or articles of manufacture disclosed herein route cloud-based service communications in a manner that reduces control-plane burdens and/or responsibilities of one or more CSA-PEs of a cloud-based network, such as the example CSA-PE 114 of the example cloud-based network environment 100 illustrated in FIG. 1, thereby preserving capacity for data handling. FIG. 2 illustrates an example cloud-based network environment 200 (also referred to herein as a network 200 or a system 200). The example network 200 includes some elements which are substantially similar to those described in FIG. 1. In the interest of brevity, similar elements will not be described again here. Instead, the interested reader is referred above to the corresponding description of FIG. 1. To facilitate this process, elements in FIG. 2 that are similar to elements in FIG. 1 include similar numerical designators having a 200 series designation rather than a 100 series designation. For example, the PE$_1$ 102 of FIG. 1 is illustrated in FIG. 2 as PE$_1$ 202.

In the illustrated example of FIG. 2, a cloud resource manager 250 is communicatively connected to PE$_1$ 202, PE$_2$ 204, PE$_3$ 206, PE$_4$ 208, the CSA-PE 214 and the RR 222. In some examples, the cloud resource manager 250 may reside and/or otherwise operate in the CSA-PE 214, the RR 222, and/or any of the network routers (e.g., $PE_1$ through $PE_4$), without limitation. For ease of discussion, however, examples disclosed herein describe the example cloud resource manager 250 as a stand-alone element communicatively connected to elements of the example network 200. In operation, and as described in further detail below, the example cloud resource manager 250 identifies one or more PEs to serve as a transit router for the CSA-PE 214. As used herein, a transit router is a PE that has been selected and/or otherwise configured to provide control-plane resources for a corresponding CSA-PE. Additionally, the example cloud resource manager 250 establishes a per-VPN default route (DR) that can be used by the example CSA-PE 214 when responding to one or more requests to transmit data on the network 200. The example DR generated and/or otherwise established by the example cloud resource manager 250 is stored in a modified VRF (mVRF) to facilitate the routing of communications (e.g., communication messages) from the example CSA-PE 214.

In response to the first user $CR_A$ 218 of the CR 216 making a request to communicate with any other node and/or user of a node in the first VPN of the example network 200 of FIG. 2, the example CSA-PE 214 routes the communication request (e.g., a communication message) to an address associated with $DR_A$ 252, which is stored in $mVRF_A$ 254. In the illustrated example of FIG. 2, the DR (e.g., $DR_A$ 252) established by the cloud resource manager 250 is associated with $PE_3$ 206, which is one of the candidate transit routers selected and/or otherwise identified by the cloud resource manager 250 to service routing needs of the example CSA-PE 214. The communication message (e.g., data) sent by $CR_A$ 218 is routed to $PE_3$ 206 due to the address routing instruction associated with $DR_A$ 252 to allow $PE_3$ 206 to further identify an ultimate destination for the communication message sent by $CR_A$ 218. When $PE_3$ 206 receives the communication message from $CR_A$ 218, $PE_3$ 206 identifies the routing destination and compares that destination with available routing information in a transit router VRF (trVRF) 256. In the illustrated example of FIG. 2, the routing destination for the communication message from $CR_A$ 218 is directed to $A_1$ 258, which is a routing destination address stored in the trVRF 256. With the referenced routing destination address identified by the trVRF 256, $PE_3$ 206 propagates the communication message to $PE_1$ 202 (see solid line with arrow 260).

To enable $A_1$ 258 to forward communications (e.g., data) to $CR_A$ 218, the $VRF_A$ 226 of $PE_1$ 202 includes routing address information for $CR_A$ 218 due to RR 222 routing information distribution activit(ies). In other examples, the router that receives communications from a network node, such as $PE_1$ 202 receiving communications from $CR_A$ 218, and learns the corresponding routing address of $CR_A$ 218 via examination of received packets associated with the communications.

Figure 3:
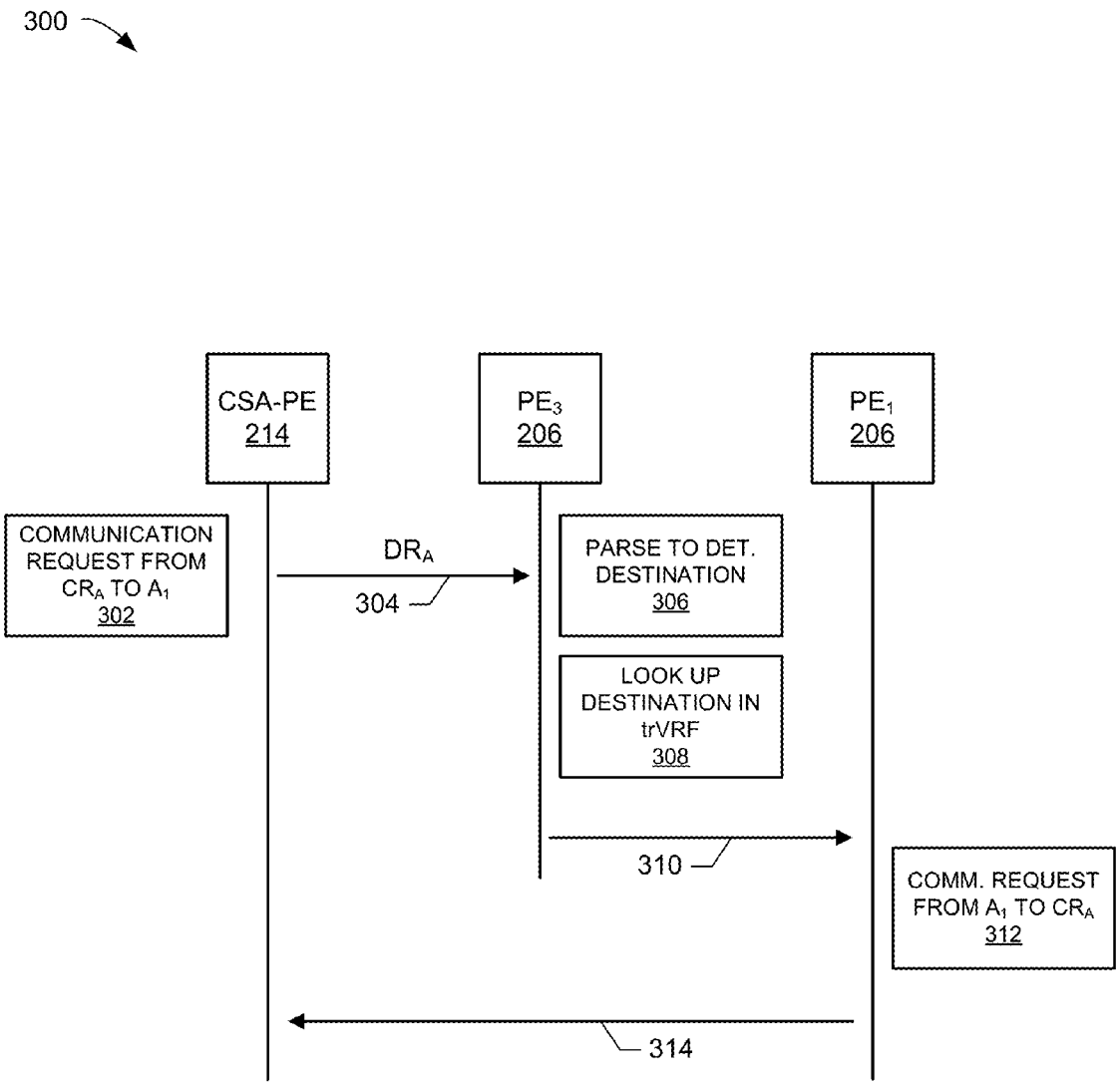
FIG. 3 is a message diagram of example communications between elements of the example system of FIG. 2.

FIG. 3 is a message diagram 300 of example communications that might occur between nodes and/or users of a VPN, such as the example first VPN of FIG. 2 associated with $PE_1$ 202, $PE_3$ 206 and $CR_A$ 218. In the example of FIG. 3, a user of cloud-based services at the CR 216, such as $CR_A$ 218, initiates a request to communicate (e.g., download, upload, service access, acknowledge, etc.) (302) with $A_1$ 258. Although the $mVRF_A$ 254 of the CSA-PE 214 does not have a routing address for $A_1$ 258, the $mVRF_A$ 254 forwards the communication (e.g., message) based on a default route address associated with $DR_A$ 252 (304). $DR_A$ 252 routes the communication to $PE_3$ 206 in the illustrated example of FIG. 3 because the cloud resource manager 250 designated $PE_3$ 206 as the transit router for CSA-PE 214. $PE_3$ 206 receives the communication addressed to $DR_A$, and parses the communication to identify the ultimate destination for the communication message (306).

The trVRF 256 is invoked by $PE_3$ 206 to determine if a match exists between the ultimate destination in the communication message and a routing address of the first VPN (308). The routing address for $A_1$ (i.e., the ultimate destination of the communication) is obtained from trVRF 256, and $PE_3$ transmits the communication message to $PE_1$ 202 based on the routing address stored therein (310). In the event $PE_1$ 202 wishes to return one or more communication(s) to $CR_A$ 218 (e.g., an acknowledgement (ACK) message), then $PE_1$ 202 identifies the routing address for $CR_A$ 218 from its corresponding $VRF_A$ 226 (312) and transmits the message to $CR_A$ 218 (314).

Figure 4:
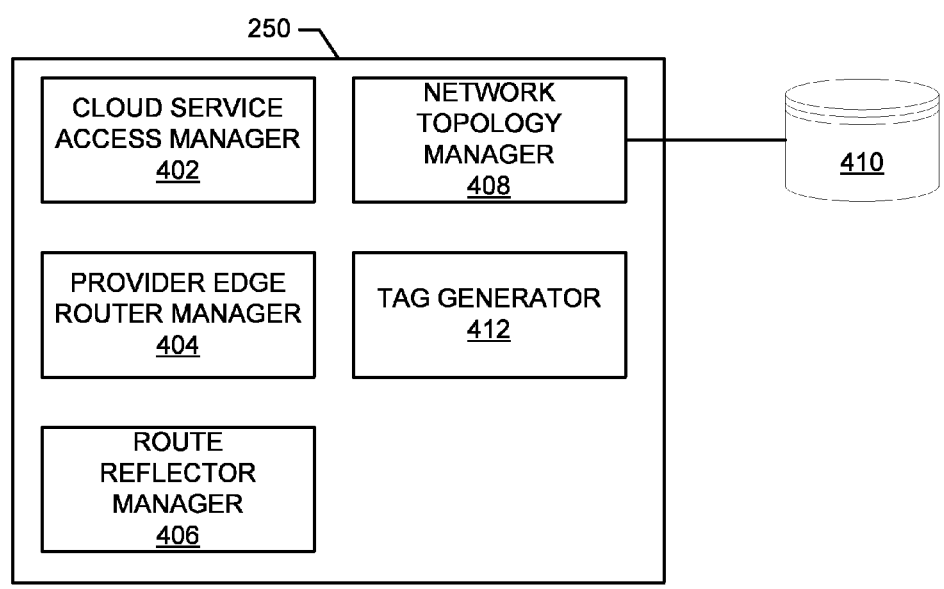
FIG. 4 is a schematic illustration of an example cloud resource manager to route cloud-based service communications in connection with FIGS. 2 and 3.

FIG. 4 is a schematic illustration of an example implementation of the example cloud resource manager 250 of FIG. 2. In the illustrated example of FIG. 4, the cloud resource manager 250 includes a cloud service access manager 402, a provider edge router manager 404, and a route reflector manager 406. Additionally, the example cloud resource manager 250 includes an example network topology manager 408 in communication with a network topology database 410, and an example tag generator 412. Some examples include means for monitoring a network of interest, means for establishing transit routers, means for forwarding route information, means for identifying a list of one or more geographically proximate PEs, and means for building tag(s) to associate with designated route(s). In the illustrated example of FIG. 4, the means for monitoring a network of interest is the example cloud service access manager 402, the means for establishing transit routers is the example provider edge router manager 404, the means for forwarding route information is the example route reflector manager 406, the means for identifying a list of one or more geographically proximate PEs is the example network topology manager 408, and the means for building tag(s) to associate with designated route(s) is the example tag generator 412. Each of the means for monitoring a network of interest, means for establishing transit routers, means for forwarding route information, means for identifying a list of one or more geographically proximate PEs, and means for building tag(s) to associate with designated route(s) may be implemented by the processor P105 of FIG. 7 executing the instructions of FIGS. 5A, 5B and 6.

In the example of FIG. 4, the cloud service access manager 402 monitors a network of interest, such as the example network 200 of FIG. 2, for one or more newly created VPNs. For each CSA-PE within the example network, the example network topology manager 408 identifies a list of one or more geographically proximate PEs that can serve as candidate transit routers for the CSA-PE. In some examples, the network topology manager 408 accesses the network topology database 410 for information indicative of PE routers that are geographically proximate to the CSA-PE of interest. Geographic information associated with the CSA-PE of interest and/or one or more PE router(s) of a network may be in the form of a street address and/or global positioning satellite (GPS) (e.g., latitude/longitude) coordinates. For example, although example methods, apparatus, systems and/or articles of manufacture disclosed herein may employ candidate transit routers that are any distance from the CSA-PE, identifying candidate transit routers that are geographically proximate helps to reduce one or more negative latency effects between network devices.

In other examples, the network topology manager 408 employs an interior gateway protocol (IGP) to determine link state information of network elements (e.g., routers) of a network. Open shortest path first (OSPF) is one example IGP to detect changes in network topology, which may be used to calculate a shortest path tree for each route. In other words, the OSPF IGP may calculate a distance in terms of communication latency rather than a physical distance between network elements.

The example selected transit router route information is forwarded by the example route reflector manager 406 to the example RR 222. On a periodic, scheduled, aperiodic and/or manual basis, the example RR 222 forwards updated route information for the network to one or more PEs and/or CSA-PEs. In other examples, each of the one or more PEs and/or CSA-PEs communicates with the RR 222 to obtain and/or otherwise retrieve updates, if any, of route information for the network, such as the example network 200 of FIG. 2. Transit routers are established by the example provider edge router manager 404 to include an associated designated route (DR), which is to be used by an associated CSA-PE, but is not relevant to other network elements.

To prevent the other network elements of a network from being inundated by the DR information associated with CSA-PE/transit router pairs, the example tag generator 412 builds a tag to associate with the DR. The tag enables the DR to be identified as a default route and retained by the CSA-PEs.

The tag may be attached by designated transit routers to their DR announcements that are transmitted to RR 222. When one or more route information announcement(s) are transmitted by the example RR 222, the CSA-PE parses the announcement(s) to determine if a tag associated with the CSA-PE is contained therein. Similarly, one or more network elements parse the announcement(s) to determine if a tag is associated thereto. If not, then the announcement(s) without an associated tag are ignored by the network elements to reduce further message processing resource consumption. However, network elements that parse the announcement(s) and identify matching tag identification information continue to extract additional information from the announcement(s). In particular, the CSA-PE having matching tag identification information stores the route address information related to the DR in the example mVRF 254.

While an example manner of implementing the example cloud resource manager 250 has been illustrated in FIGS. 2-4, one or more of the elements, processes and/or devices illustrated in FIGS. 2-4 may be combined, divided, re-arranged, omitted, eliminated and/or implemented in any other way. Further, the example cloud resource manager 250, the example cloud service access manager 402, the example provider edge router manager 404, the example route reflector manager 406, the example network topology manager 408, the example network topology database 410 and/or the example tag generator 412 of FIGS. 2 and 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example cloud resource manager 250, the example cloud service access manager 402, the example provider edge router manager 404, the example route reflector manager 406, the example network topology manager 408, the example network topology database 410 and/or the example tag generator 412 of FIGS. 2 and 4 are hereby expressly defined to include a tangible computer readable medium such as a memory, DVD, CD, etc. storing the software and/or firmware. Further still, the example system 200 of FIG. 2 may include one or more elements, processes and/or devices in addition to, or instead of, those illustrated in FIGS. 2 and 4, and/or may include more than one of any or all of the illustrated elements, processes and devices.

Figure 5A:
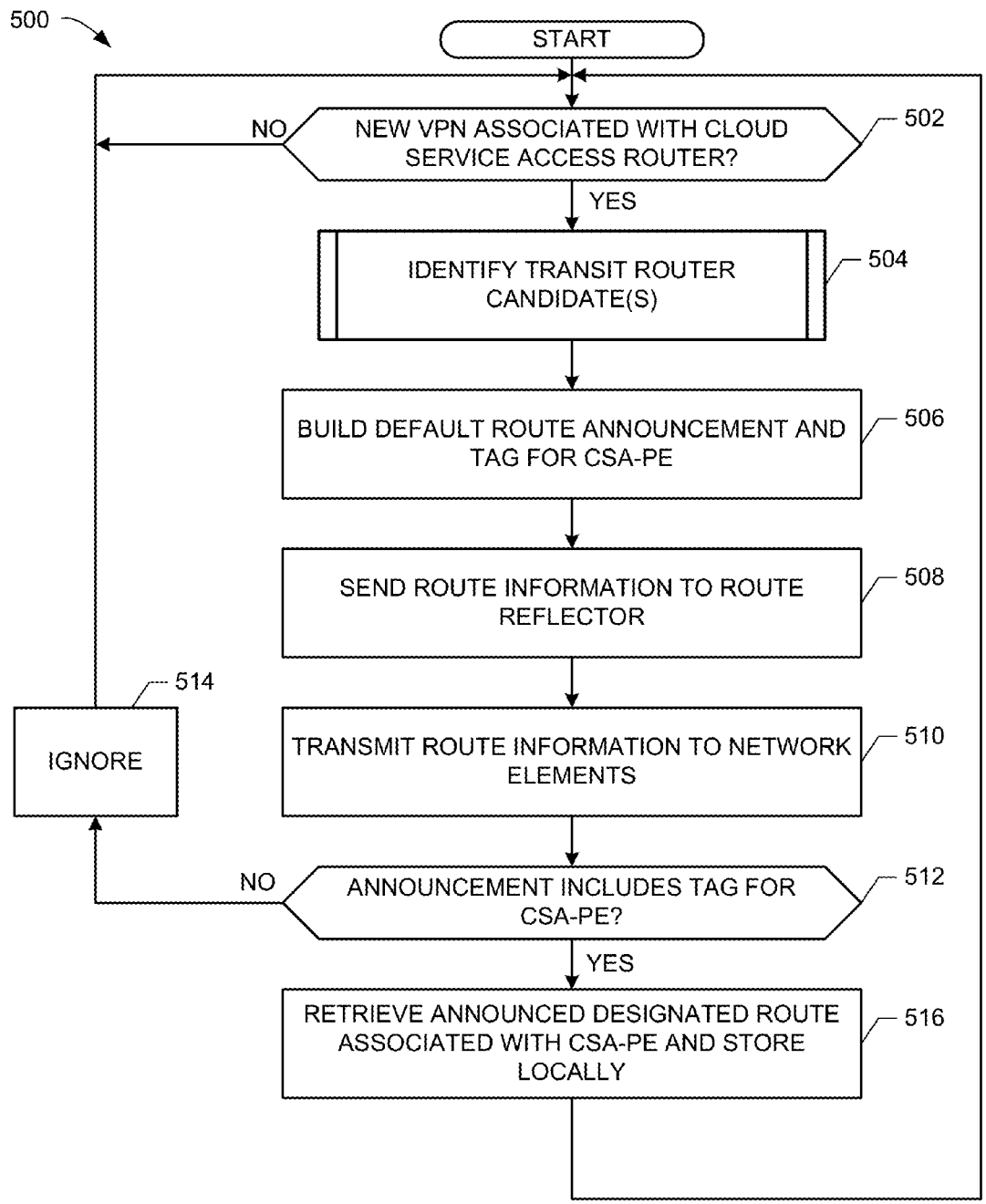
FIGS. 5A, 5B and 6 are flowcharts representative of example machine readable instructions that may be executed to implement the example system of FIG. 2 and/or the example cloud resource manager of FIGS. 2 and 4.
Figure 5B:
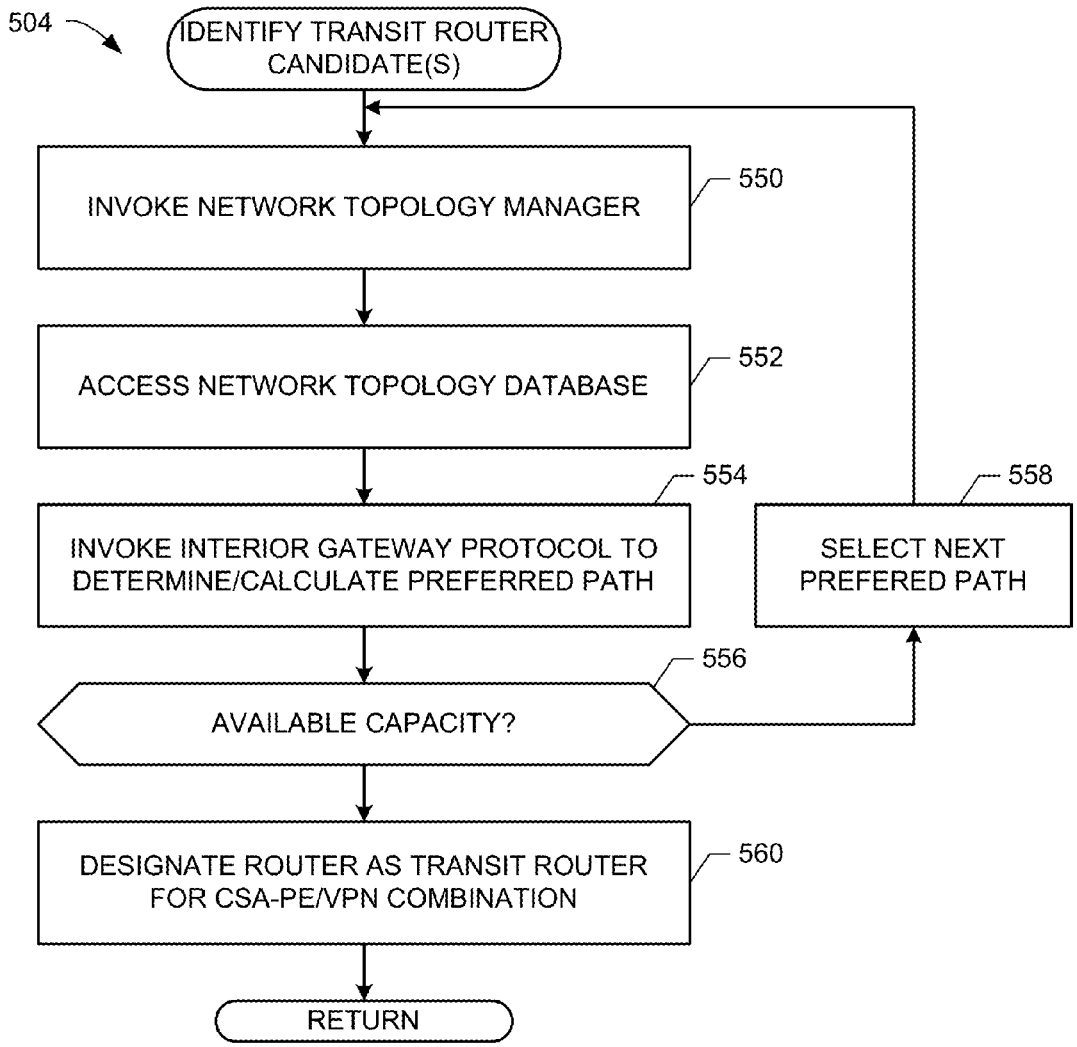
Figure 6:
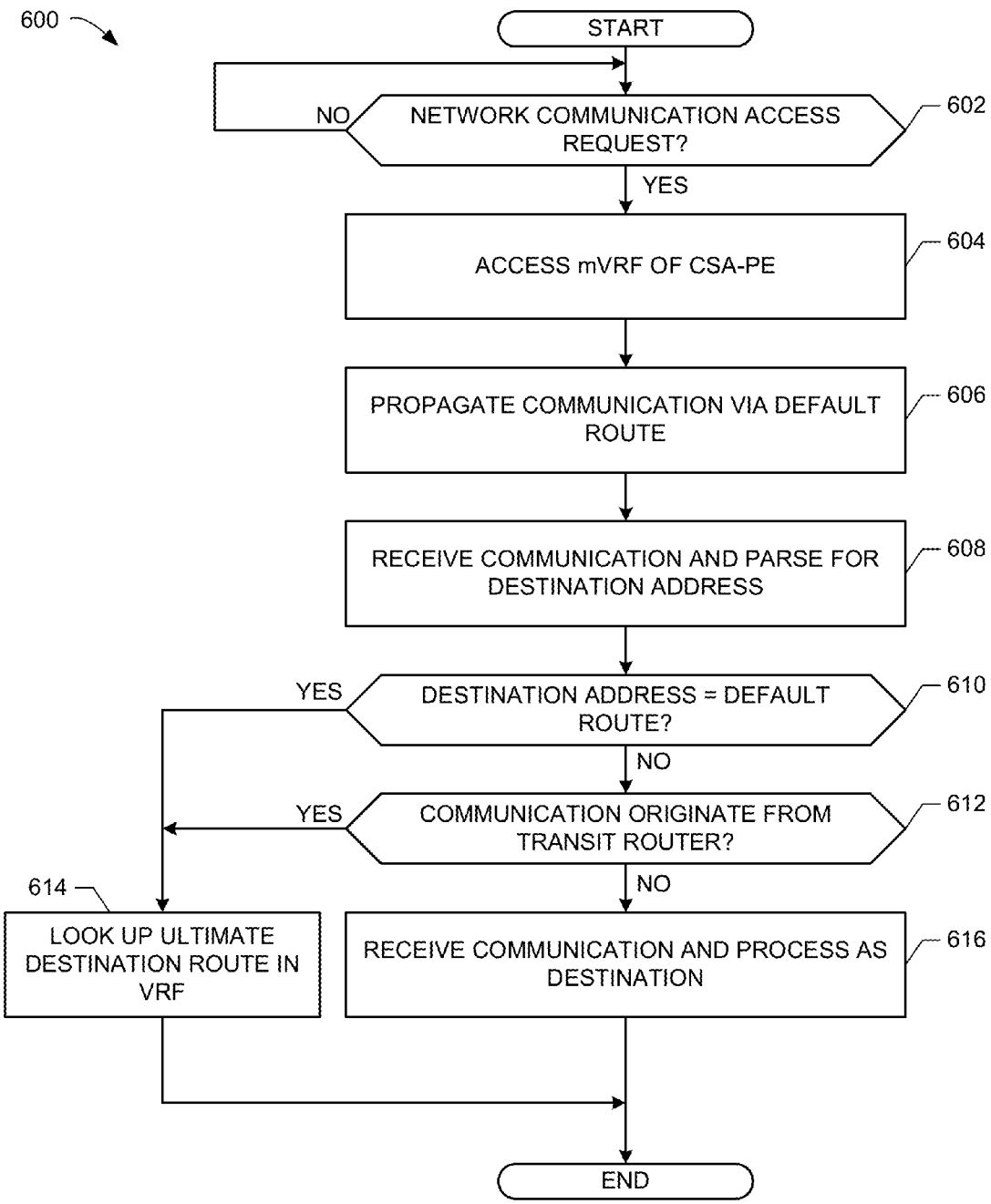

Flowcharts representative of example machine readable instructions for implementing the system 200 of FIG. 2 and/or the example cloud resource manager of FIGS. 2 and 4 are shown in FIGS. 5A, 5B and 6. In these examples, the machine readable instructions comprise a program for execution by a processor such as the processor P105 shown in the example processor platform P100 discussed below in connection with FIG. 7. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 5A, 5B and 6, many other methods of implementing the example system 200 and/or the example cloud resource manager 250 may alternatively be used. For example, the order of execution of the blocks may be changed, and/or some of the blocks described may be changed, eliminated, or combined.

As mentioned above, the example processes of FIGS. 5A, 5B and 6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5A, 5B and 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The program 500 of FIG. 5A begins at block 502 where the example cloud service access manager 402 monitors for one or more new VPNs added to a cloud-based network environment, such as the example cloud-based network environment 200 of FIG. 2. If no new/additional VPNs are added to the example cloud-based network environment 200, then the example program 500 continues to monitor the environment 200 (block 502). However, in the event the example cloud service access manager 402 identifies that one or more VPNs have been added to the example cloud-based network environment 200 (block 502), the example provider edge router manager 404 identifies PEs that may serve as transit router candidate(s) (block 504). Turning briefly to FIG. 5B, the example provider edge router manager 404 invokes the example network topology manager 408 to identify transit router candidate(s) for a CSA-PE associated with the new/additional VPNs established on the example cloud-based network environment 200 (550). In the example described herein, CSA-PE 214 has been configured to participate in a new VPN of the example cloud-based network environment 200. The example network topology manager 408 accesses an example network topology database 410 containing location information for PEs of the example cloud-based network environment 200 (block 552). The location information stored by the example network topology database 410 includes, but is not limited to, street address information associated with each PE and/or latitude/longitude information associated with each PE of the cloud-based network environment 200.

PEs new to the CSA-PE 214 (e.g., having the closest geographic proximity to) are identified as candidate transit routers (block 552), and the example network topology manager 408 invokes an IGP to determine and/or otherwise calculate an optimum path between the CSA-PE 214 and one of the candidate transit routers (block 554). Generally speaking, network elements (e.g., CSA-PEs, PEs, etc.) having a closer geographic proximity to each other also have a corresponding lower latency effect when communicating therebetween than network elements that are farther separated geographically. However, in some circumstances, a closer geographic proximity does not necessarily correspond to a lower latency effect. For example, some candidate transit routers (e.g., PEs) may have varying degrees of latency due to bandwidth capacity of the candidate transit router, a manufacturer/model type of the candidate transit router, and/or an infrastructure quality of cable connected to the candidate transit router. In view of the possibility that a closest proximate candidate transit router may not have an optimum latency effect (e.g., a latency measurement), the example network topology manager 408 invokes the IGP, such as the OSPF, to calculate and/or otherwise identify a preferred distance in terms of communication latency (block 554).

If the candidate transit router selected by the example network topology manager 408 does not have available capacity to serve as the transit router for the CSA-PE 214 (block 556), the example provider edge router manager 404 selects a next preferred path (block 558) and the example program 500 returns to block 552. On the other hand, if the candidate transit router selected by the example network topology manager 408 has available capacity to serve as the transit router for the CSA-PE 214 (block 556), then the example provider edge router manager 404 assigns and/or otherwise designates the candidate transit router to the CSA-PE 214 (block 560).

Returning to FIG. 5A, the example tag generator 412 builds a default route (DR) announcement message and associated identification tag for the CSA-PE 214 (block 506). The example route reflector manager 406 accesses the example RR 222 and transmits the DR announcement thereto (block 508). As described above, the example RR 222 is chartered with keeping the network elements of the example cloud-based network environment 200 (e.g., PEs, CSA-PEs, etc.) of routing address information for use during the exchange of network communication messages (e.g., audio, video, text, control message(s), acknowledgement (ACK) message(s), etc.). On a periodic, aperiodic, scheduled and/or manual basis (e.g., upon request by the example cloud resource manager 250), the example RR 222 transmits the routing address information to each network element (block 510).

However, while the example RR 222 operates as, in part, a route address distribution mechanism for the example cloud-based network environment 200, the methods, systems, apparatus and/or articles of manufacture disclosed herein reduce (e.g., minimize) control-plane responsibilities for CSA-PEs to facilitate a greater degree of data-plane functionality for the CSA-PEs. Accordingly, the DR announcement transmitted by the example RR 222 is received by the one or more network elements of the example cloud-based network environment 200 and examined for an associated tag (block 512). For each network element that is not configured to accept route announcement(s) carrying the tag information, the DR announcement is ignored (block 514). However, when the DR announcement transmitted by the example RR 222 is received by a network element that accepts and retains route announcement(s) carrying the tag information, the DR address route information is stored on the receiving network element (block 516). For example, when the DR address route information is received by $PE_3$ 206, the trVRF 256 is updated to include DR 252. Additionally, when the DR address route information is received by CSA-PE 214, the mVRF 254 is updated to include DR 252.

In other examples, the example cloud resource manager 250 may avoid the use of the example RR 222 when propagating DR information to a corresponding PE/CSA-PE pair. For example, after the example tag generator 412 builds the DR announcement message and associated identification tag for the CSA-PE 214 (block 506), the example provider edge router manager 404 may directly access the corresponding PE (e.g., $PE_3$ 206 in this illustrated example) to modify and/or otherwise build the trVRF 256 to include the DR address information. Similarly, after the example tag generator 412 builds the DR announcement message and associated identification tag for the CSA-PE 214 (block 506), the example provider edge router manager 404 may directly access the corresponding CSA-PE (e.g., CSA-PE 214 in this illustrated example) to modify and/or otherwise build the mVRF 254 to include the DR address information.

In the illustrated example of FIG. 6, a program 600 responds to communication request(s) (e.g., communication message(s) within the cloud-based network environment 200). The program 600 of FIG. 6 begins at block 602 where a user of cloud resources, such as the example CR 216 of FIG. 2, makes one or more communication access request(s) on the VPN. For example, if $CR_A$ 118 at CR 216 makes a request to communicate with $A_1$ 258, the CSA-PE 214 references its mVRF 254 to determine a destination routing address for $A_1$ 258. While prior-art implementations of a CSA-PE included a corresponding VRF that included all available route addresses for a given VPN, because CSA-PEs can facilitate communications for multiple VPNs, the control-plane responsibilities for the CSA-PEs became overburdened. However, upon receipt of the communication request from $CR_A$ 218, the example CSA-PE 214 accesses the example mVRF 254 (block 604), which includes the DR 252 rather than a full list of all available routing addresses. Accordingly, the CSA-PE 214 forwards the communication request(s) from $CR_A$ 218 via the DR 252, which results in the communication request(s) from $CR_A$ 218 propagating to $PE_3$ 206 (block 606).

Upon receipt of a communication message, the example PE 206 parses the message for a destination address (block 608). If the parsed destination address is not associated with a DR (block 610), then the communication message is deemed to be associated with either a user of the PE 206 (e.g., $A_m$) or a message for which the PE 206 is a final destination. In the event that the PE 206 identifies that the communication message originated from itself (block 612), then the PE 206 looks-up the ultimate destination route address in the trVRF 256 (block 614). On the other hand, if the PE 206 identifies that the communication message originated from a network element within the example cloud-based network environment 200 (block 612), then the communication message is received as a destination of the PE 206 (block 616). For example, the PE 206 may further process the received communication message to determine a unique user for which the message should be forwarded, such as $A_m$. In the event that the parsed destination address is associated with a DR (block 610), then the communication message is deemed to be associated with the corresponding CSA-PE 214 for which an ultimate destination routing address is identified from the trVRF 256 (block 614).

Figure 7:
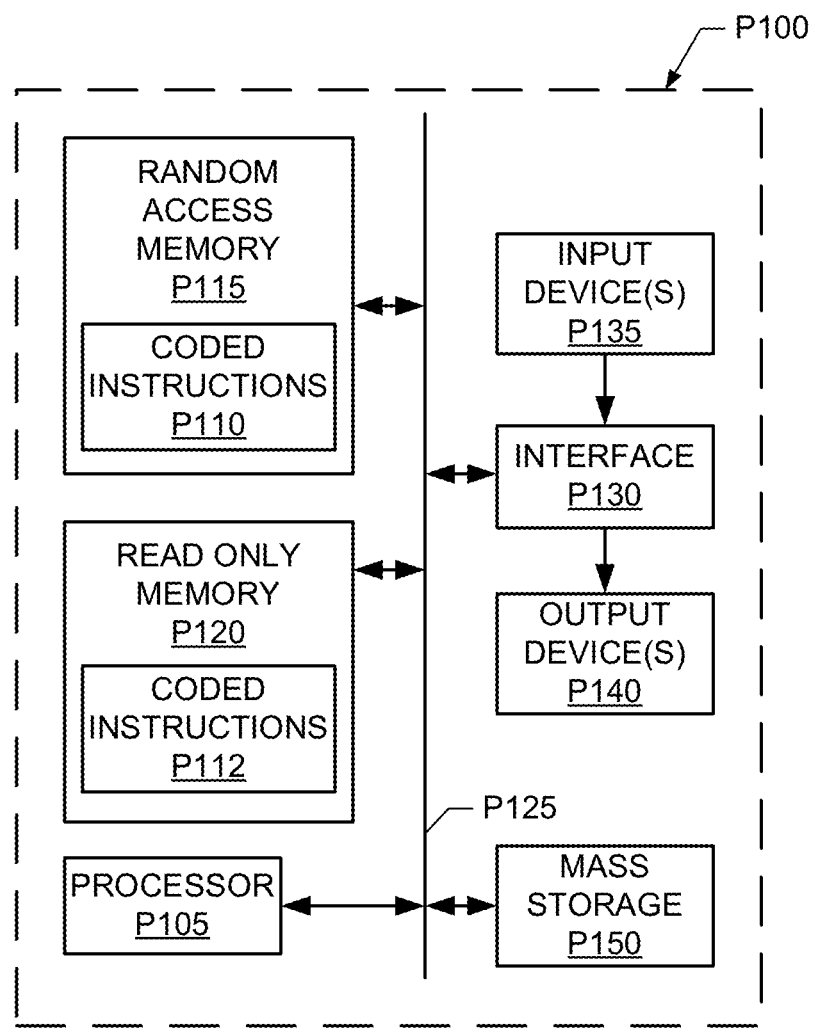
FIG. 7 illustrates an example processor platform that may execute the instructions of FIGS. 5A, 5B and 6 to implement any or all of the example methods, systems, and/or apparatus disclosed herein.

FIG. 7 is a block diagram of an example processor platform P100 capable of executing the instructions of FIGS. 5A, 5B and 6 to implement the example system 200 and cloud resource manager 250 of FIGS. 2-4. The processor platform P100 can be, for example, a server, a personal computer, or any other type of computing device.

The processor platform P100 of the instant example includes a processor P105. For example, the processor P105 can be implemented by one or more Intel® microprocessors. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the volatile memory P115 and the non-volatile memory P120 is typically controlled by a memory controller.

The processor platform P100 also includes an interface circuit P130. The interface circuit P130 may be implemented by any type of past, present or future interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, an isopoint, and/or a voice recognition system.

One or more output devices P140 are also connected to the interface circuit P130. The output devices P140 can be implemented, for example, by display devices (e.g., a liquid crystal display, and/or a cathode ray tube display (CRT)). The interface circuit P130, thus, typically includes a graphics driver card.

The interface circuit P130 also includes a communication device, such as a modem or network interface card to facilitate exchange of data with external computers via a network (e.g., an Ethernet connection, a digital subscriber line (DSL), a telephone line, coaxial cable, a cellular telephone system, etc.).

The processor platform P100 also includes one or more mass storage devices P150 for storing software and data. Examples of such mass storage devices P150 include floppy disk drives, hard drive disks, compact disk drives and digital versatile disk (DVD) drives.

Coded instructions for performing the programs illustrated and described in FIGS. 5A, 5B and 6 may be stored as the coded instructions P110 and/or P112 in the mass storage device P150, in the volatile memory P115, in the non-volatile memory P120, and/or on a removable storage medium such as a CD or DVD.

From the foregoing, it will be appreciated that disclosed example methods, apparatus, systems and/or articles of manufacture allow one or more CSA-PEs associated with one or more VPNs of a cloud-based networking environment to focus on data-plane activities due to reduced control-plane traffic. Accordingly, rather than become overburdened with address management of a relatively high number of PEs and/or unique users at each of the PEs, example methods, apparatus, systems and/or articles of manufacture disclosed herein employ a default route and shift control-plane burdens to one or more PEs of the example cloud-based networking environment.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   identifying, by a cloud resource manager comprising a processor, a virtual private network addition to a cloud-computing network;
   generating, by the cloud resource manager, a default route address associated with a selected one of a plurality of candidate transit routers in response to identifying the virtual private network addition to the cloud-computing network;
   generating, by the cloud resource manager, a list of transit routers in response to identifying a geographic distance between each of the transit routers and a cloud service access router; and
   assigning, by the cloud resource manager, the default route address to the cloud service access router to direct a routing request from the cloud service access router to the selected one of the candidate transit routers via the default route address.

2. The method of claim 1, wherein identifying the geographic distance comprises calculating distances between a street address of the cloud service access router and the transit routers.

3. The method of claim 1, wherein identifying the geographic distance comprises calculating distances between global positioning coordinates of the cloud service access router and the transit routers.

4. The method of claim 1, further comprising selecting one of a list of candidate transit routers based on a distance between the cloud service access router and the selected one of the candidate transit routers.

5. The method of claim 4, wherein the distance comprises a latency effect between the cloud service access router and the selected one of the candidate transit routers.

6. The method of claim 5, wherein the latency effect is identified by an open shortest path first network protocol.

7. The method of claim 1, further comprising generating a modified virtual routing forwarding table in the cloud service access router to store the default route address.

8. The method of claim 1, further comprising generating a transit router virtual routing forwarding table in the selected one of the list of candidate transit routers to store the default route address.

9. The method of claim 8, further comprising directing the routing request to a destination based on an address look-up in the transit router virtual routing forwarding table when the selected one of the list of candidate transit routers identifies the default route in the routing request.

10. An apparatus comprising:
a processor; and
a memory that stores computer-executable instructions that, when executed by the processor, cause the processor to perform operations comprising
generating, by a tag generator, a default route address associated with a selected one of a plurality of candidate transit routers in response to identifying a virtual private network addition to a cloud-computing network;
identifying, by a network topology manager, a geographic distance between each of the plurality of candidate transit routers and the cloud service access router; and
assigning, by a route reflector manager, the default route address to a cloud service access router to direct a routing request from the cloud service access router to the selected one of the candidate transit routers via the default route address.

11. The apparatus of claim 10, further comprising a network topology database to calculate distances between a street address of the cloud service access router and each of the plurality of candidate transit routers.

12. The apparatus of claim 10, further comprising a network topology database to calculate distances between global positioning coordinates of the cloud service access router and each of the plurality of candidate transit routers.

13. The apparatus of claim 10, further comprising a provider edge router manager to generate a modified virtual routing forwarding table in the cloud service access router to store the default route address.

14. A tangible computer readable medium having instructions stored thereon that, when executed by a processor, cause the processor to perform operations comprising:
identifying a virtual private network addition to a cloud-computing network;
generating a list of candidate transit routers to receive routing requests associated with the virtual private network;
generating a default route address associated with a selected one of the candidate transit routers;
identifying a geographic distance between each of the transit routers and the cloud service access router; and
assigning the default route address to a cloud service access router to direct a routing request from the cloud service access router to the selected one of the candidate transit routers via the default route address.

15. The tangible computer readable medium of claim 14 having instructions stored thereon that, when executed, cause the processor to perform operations further comprising:
calculating distances between a street address of the cloud service access router and the transit routers.

16. The tangible computer readable medium of claim 14 having instructions stored thereon that, when executed, cause the processor to perform operations further comprising:
calculating distances between global positioning coordinates of the cloud service access router and the transit routers.

17. The tangible computer readable medium of claim 14 having instructions stored thereon that, when executed, cause the processor to perform operations further comprising:
selecting one of the list of candidate transit routers based on a distance between the cloud service access router and the selected one of the candidate transit routers.

18. The tangible computer readable medium of claim 17 having instructions stored thereon that, when executed, cause the processor to perform operations further comprising:
calculating a latency effect between the cloud service access router and the selected one of the candidate transit routers.

19. The tangible computer readable medium of claim 18 having instructions stored thereon that, when executed, cause the processor to perform operations further comprising:
identifying the latency effect by an open shortest path first network protocol.

20. The tangible computer readable medium of claim 14 having instructions stored thereon that, when executed, cause the processor to perform operations further comprising:
generating a modified virtual routing forwarding table in the cloud service access router to store the default route address.

21. The tangible computer readable medium of claim 14 having instructions stored thereon that, when executed, cause the processor to perform operations further comprising:
generating a transit router virtual routing forwarding table in the selected one of the list of candidate transit routers to store the default route address.

22. The tangible computer readable medium of claim 21 having instructions stored thereon that, when executed, cause the processor to perform operations further comprising:
directing the routing request to a destination based on an address look-up in the transit router virtual routing forwarding table when the selected one of the list of candidate transit routers identifies the default route in the routing request.

* * * * *